J. E. LEONARD.
ADJUSTABLE IRIS FOR CAMERAS.
APPLICATION FILED NOV. 7, 1919.

1,392,876.

Patented Oct. 4, 1921.
5 SHEETS—SHEET 1.

INVENTOR.
JOHN E. LEONARD.
BY Hazard & Miller
ATTORNEYS.

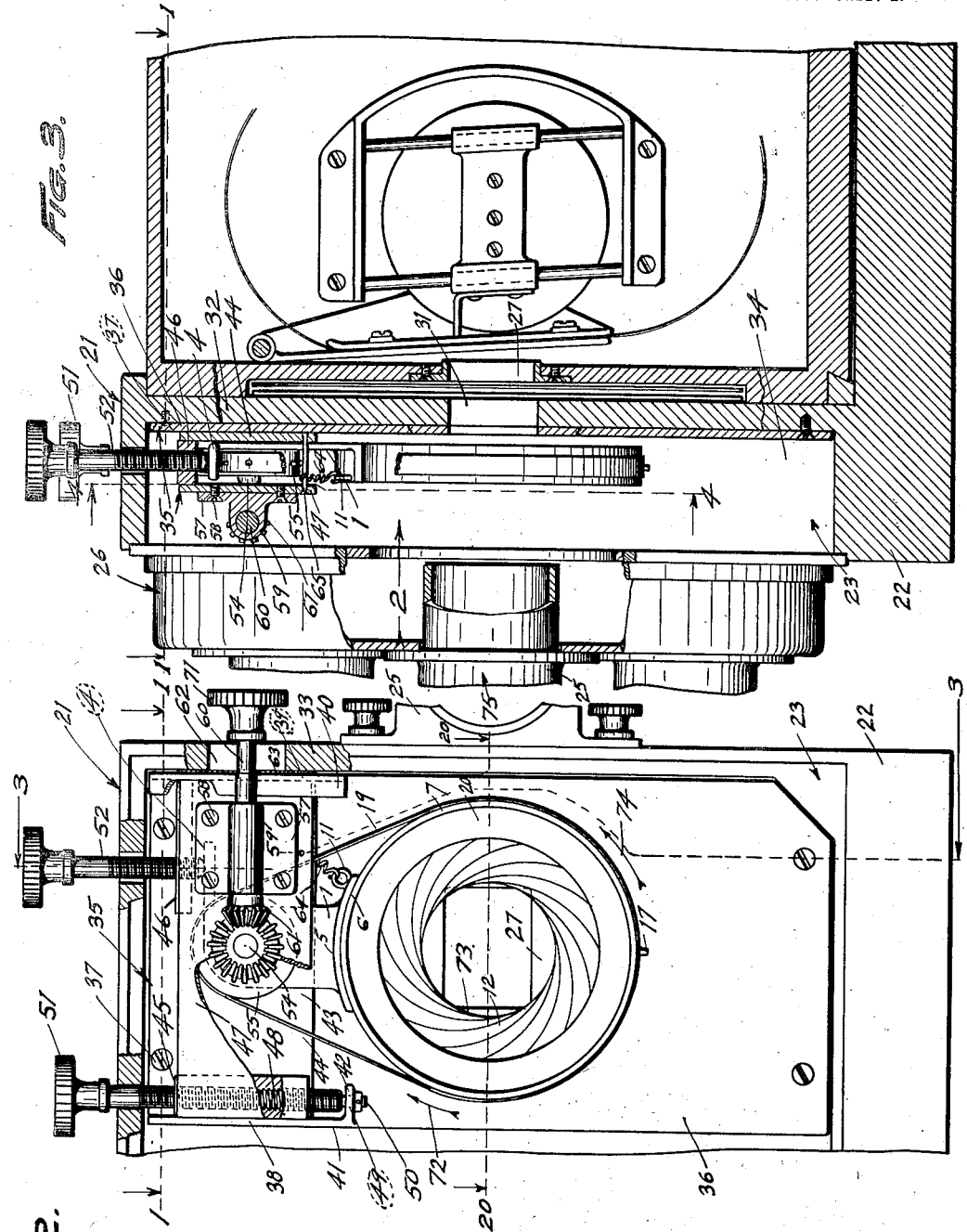

J. E. LEONARD.
ADJUSTABLE IRIS FOR CAMERAS.
APPLICATION FILED NOV. 7, 1919.
1,392,876.
Patented Oct. 4, 1921.
5 SHEETS—SHEET 3.
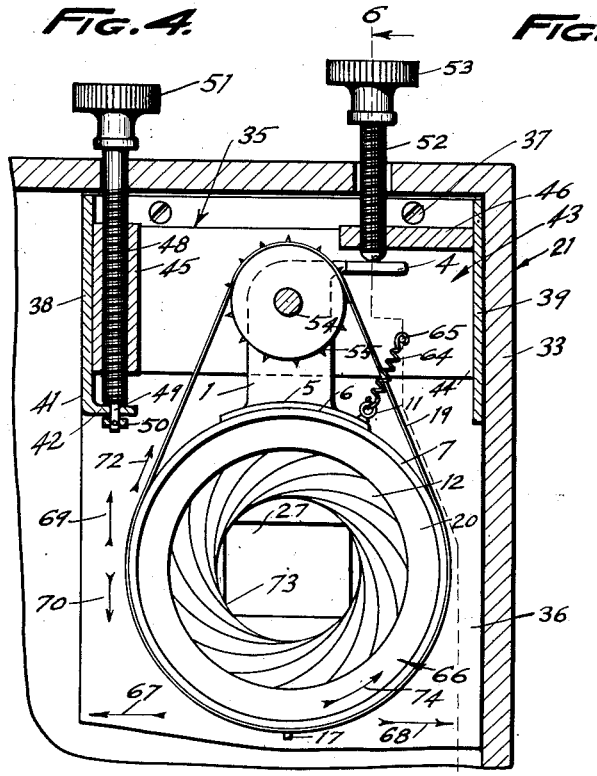
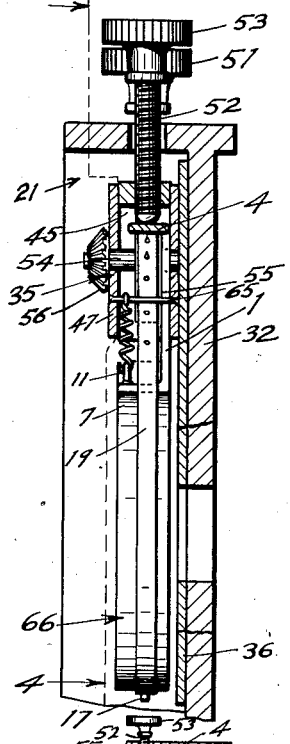
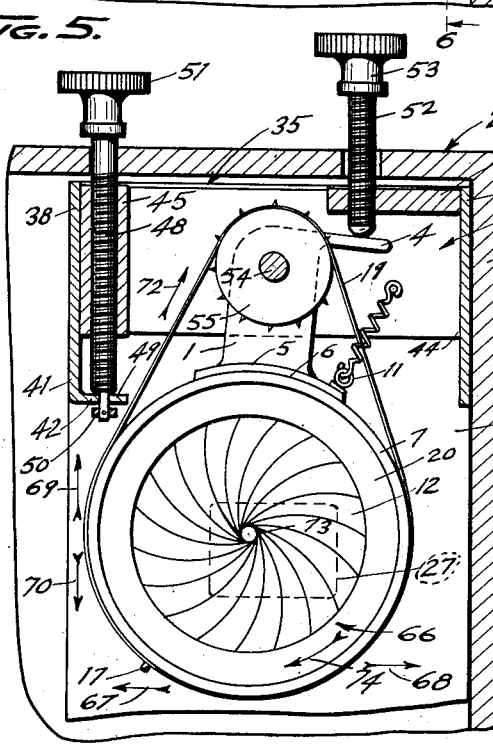
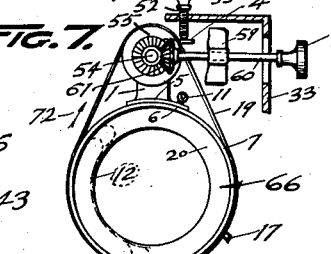
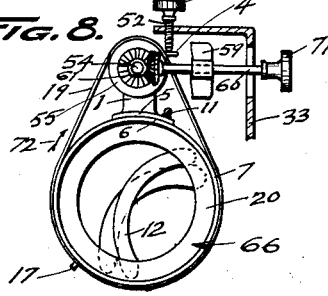
INVENTOR.
John E. Leonard.
BY Hazard & Miller
ATTORNEYS.

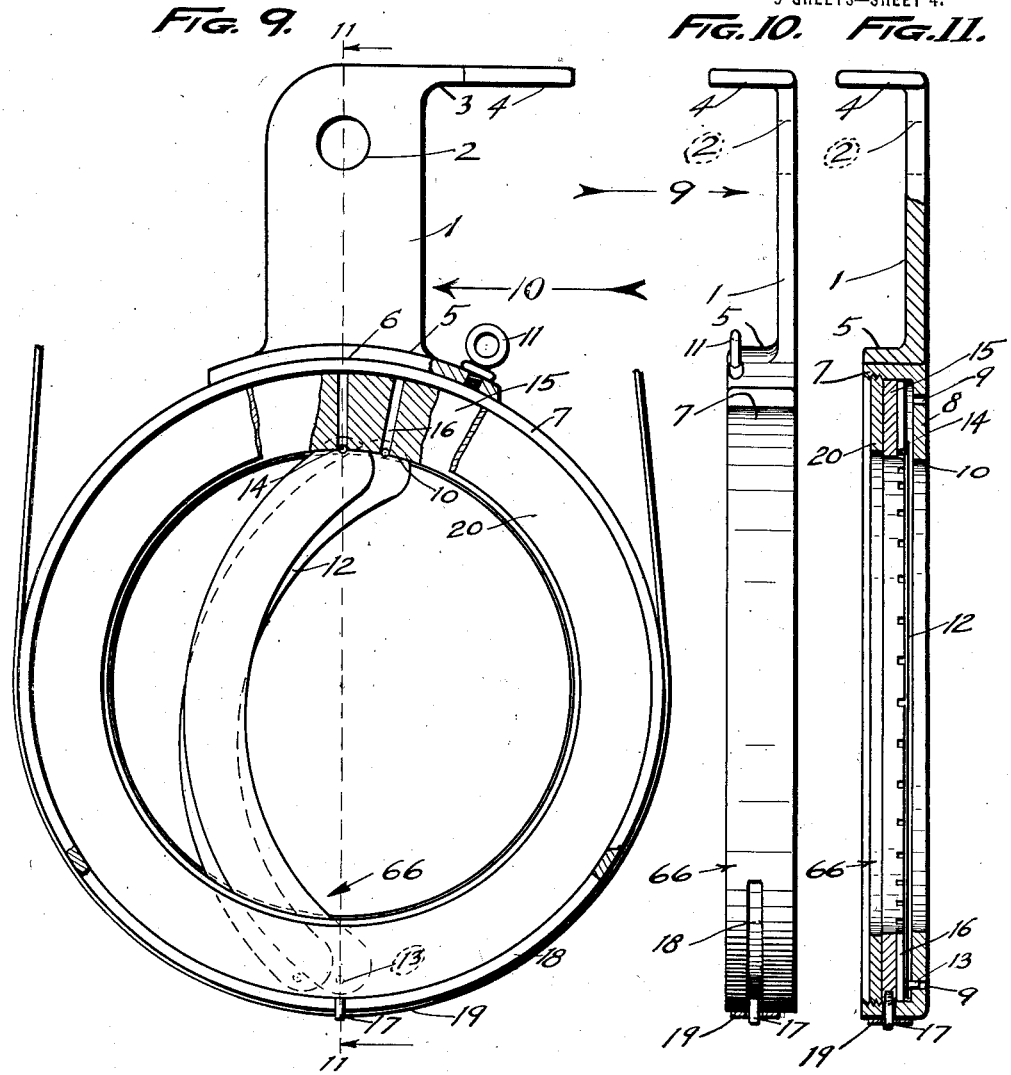
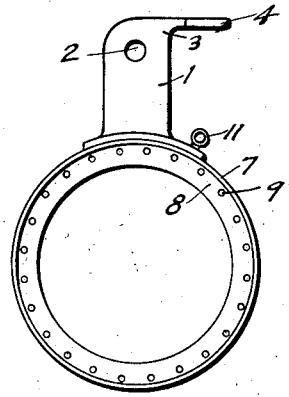

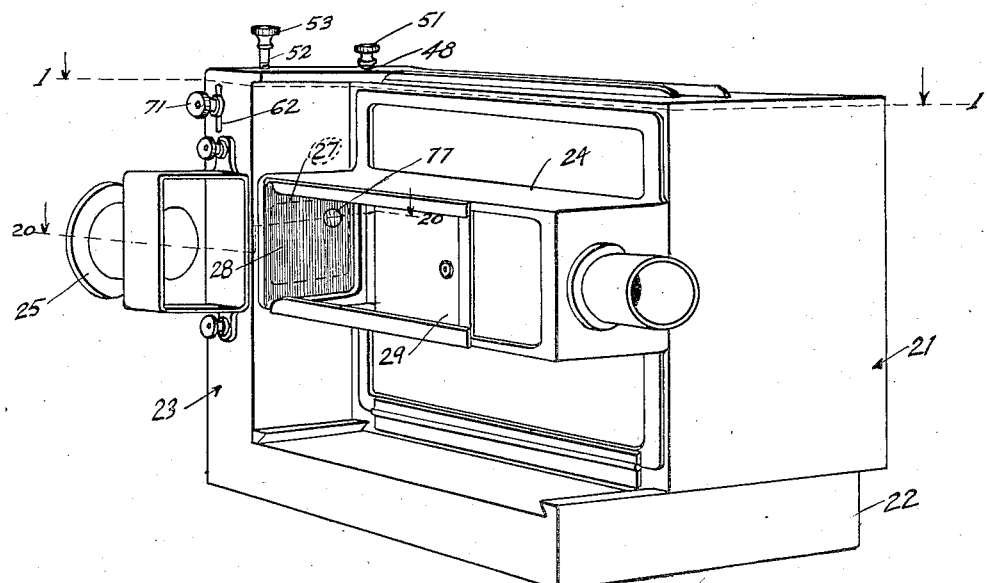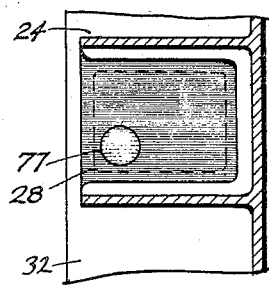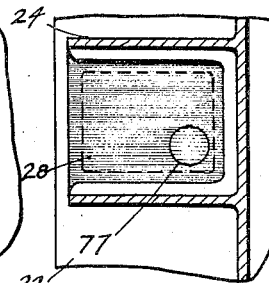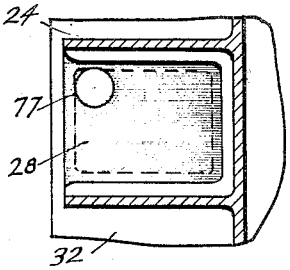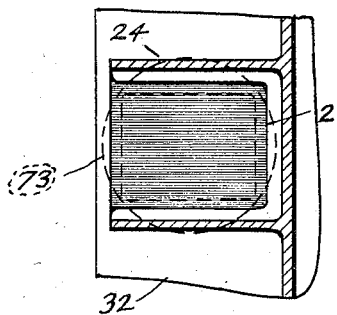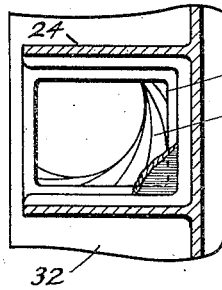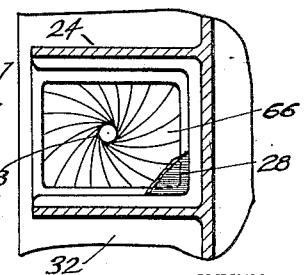

UNITED STATES PATENT OFFICE.

JOHN E. LEONARD, OF LOS ANGELES, CALIFORNIA, ASSIGNOR, BY MESNE ASSIGNMENTS, TO MITCHELL CAMERA CO., A CORPORATION.

ADJUSTABLE IRIS FOR CAMERAS.

1,392,876. Specification of Letters Patent. Patented Oct. 4, 1921.

Application filed November 7, 1919. Serial No. 336,393.

*To all whom it may concern:*

Be it known that I, JOHN E. LEONARD, a citizen of the United States, residing at Los Angeles, in the county of Los Angeles and State of California, have invented new and useful Improvements in Adjustable Irises for Cameras, of which the following is a specification.

My invention relates to moving picture cameras and consists of the novel features herein shown, described and claimed.

An object of my invention is to make a camera having an adjustable iris immediately in front of the exposure aperture and behind the lens.

Another object of my invention is to make an adjustable iris adapted to be mounted between a lens and an exposure aperture and having means for adjusting the center of the iris to any point within the exposure aperture and having means for opening and closing the iris.

Fig. 2 is a fragmentary front elevation showing the adjustable iris with the lens magazine removed from in front of the iris, the view being taken looking in the direction indicated by the arrows 2 in Fig. 3.

Fig. 3 is a fragmentary vertical sectional detail longitudinally of the axis and on the line 3—3 of Fig. 2 and looking in the direction indicated by the arrows.

Fig. 4 is a sectional detail on a plane parallel with Fig. 2 and on the lines 4—4 of Figs. 3 and 6 and looking in the direction idnicated by the arrows and showing an operation.

Fig. 5 is a view analogous to Fig. 4 and showing the parts in different positions.

Fig. 6 is a sectional detail on a plane parallel with Fig. 3 and on the line 6—6 of Fig. 4 and looking in the direction indicated by the arrows.

Fig. 7 is a view analogous to Fig. 2 upon a reduced scale and illustrating the operation.

Fig. 8 is a view analogous to Fig. 7 and still further illustrating the operation.

Fig. 9 is an enlarged fragmentary front elevation of the iris frame with parts removed and parts shown in section, the view being taken looking in the direction indicated by the arrow 9 in Fig. 10.

Fig. 10 is an edge view looking in the direction indicated by the arrow 10 in Fig. 9.

Fig. 11 is a vertical cross section on the line 11—11 of Fig. 9.

Fig. 12 is a front elevation on a reduced scale of the iris frame with all the other parts removed.

Fig. 13 is a perspective of a camera having a finder along side of the camera box and showing the camera box shifted to bring the finder into line with the exposure aperture and illustrating the operation of the adjustable iris by showing its effect upon the ground glass screen in the finder.

Fig. 14 is a vertical cross section behind the ground glass screen and showing the iris shifted to register in a different position upon the ground glass screen.

Figs. 15 and 16 are views analogous to Fig. 14 and showing the finder registering in still different positions.

Fig. 17 is a view analogous to Figs. 14, 15 and 16 and showing the iris wide open to register squarely upon the ground glass screen.

Fig. 18 shows the iris partly closed and off center.

Fig. 19 shows the iris nearly closed and centered.

Figure 1:
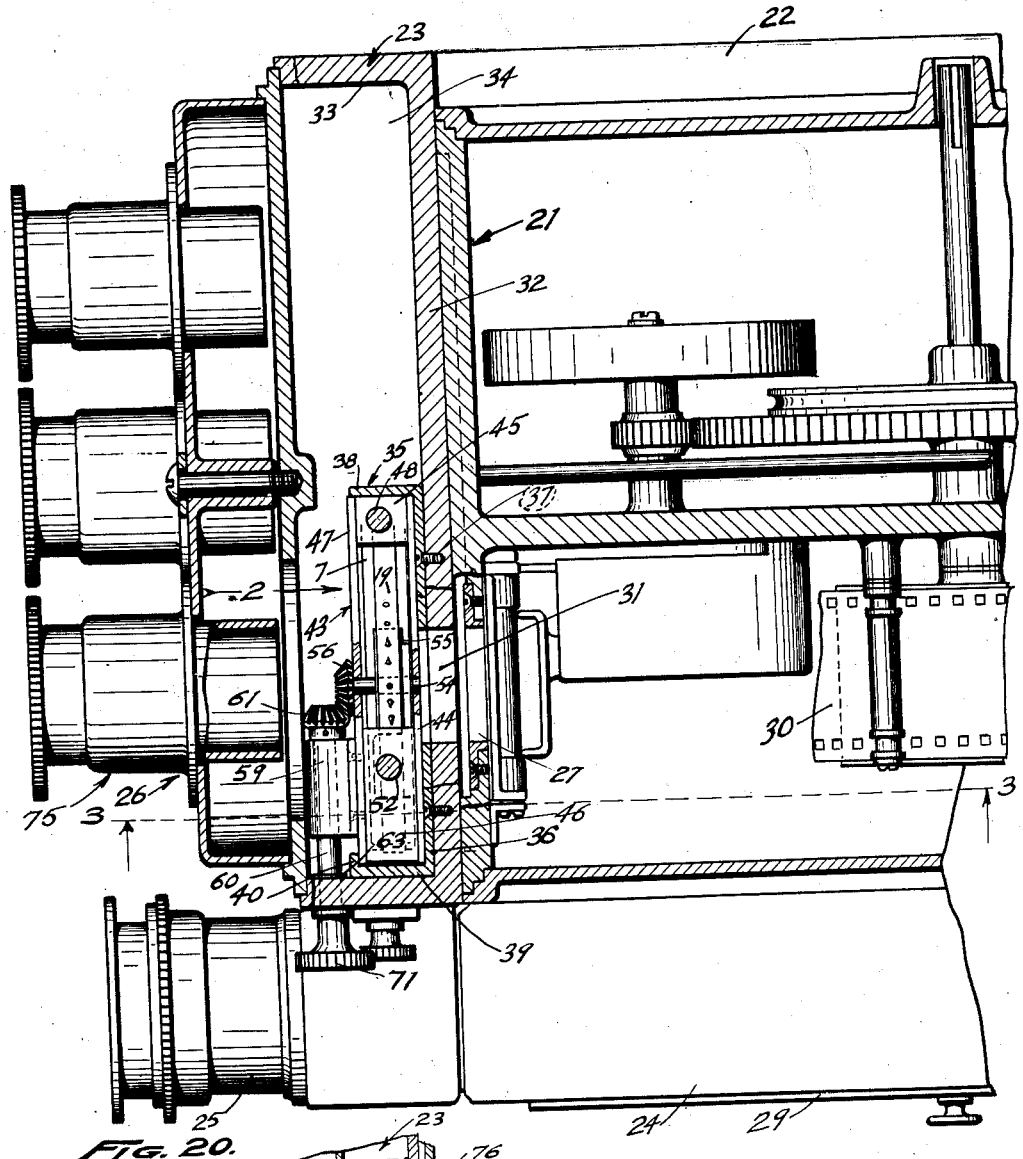
Figure 1 is a fragmentary horizontal section on the lines 1—1 of Figs. 2, 3 and 13 and looking downwardly as indicated by the arrows.

Referring to Figs. 9, 10, 11 and 12, the pivot supporting arm 1 is flat and of considerable width in front elevation and comparatively thin in side elevation. A pivot hole 2 is formed through the arm 1 near its upper end. The tilting lever 3 extends from the upper end of the arm 1 above the pivot hole 2 at right angles. Normally the supporting arm 1 is vertical and the tilting arm 3 is horizontal.

The adjusting screw plate 4 extends forwardly from the free end of the tilting arm 3. An attaching plate 5 is formed integral with the lower end of the arm 1 and has a curved lower face 6. The housing ring 7 fits against the face 6 and is soldered in place. The annular supporting flange 8 extends inwardly from the back edge of the housing ring 7 and forms the frame around the iris opening when the iris opening is expanded to its full extent. Pivot pin holes 9 are formed through the flange 8 near to the housing ring 7 and some distance from the inner edge 10. A screw eye 11 is tapped into the attaching plate 5.

The leaves 12 are thin flat plates and extend through about one-third of a circle. Pivot pins 13 are fixed in the leaves 12 and extend into the pivot holes 9. Usually there are about thirty leaves 12 in an iris and the pin holes 9 are evenly spaced apart entirely around the circle. Cam pins 14 are fixed in the opposite ends of the leaves 12 from the pivot pins 13. The flange 8 is laid horizontally with the housing ring 7 extending upwardly and the leaves 12 are placed in position with the pivot pins 13 in the pin holes 9 and the cam pins 14 projecting upwardly.

The cam ring 15 is flat and substantially the same size as the flange 8 and fits loosely within the housing ring 7. Cam slots 16 are formed in the rear face of the cam ring 15, said slots being evenly spaced apart and extending radially across the cam ring. The cam ring 15 is placed in position with the slots downwardly and the cam pins 14 are arranged in the proper cam slots 16. A stud 17 extends radially from the periphery of the cam ring 15 through an extended slot 18 formed in the housing ring 7 and the stud 17 extends through the center of the sheet metal operating belt 19, so that when the belt 19 is pulled one way the cam ring 15 is moved one way to open the iris, and when the belt is pulled the other way the cam ring 15 is operated the other way to close the iris. The retaining ring 20 is screwed into the housing ring 7 against the cam ring 15 and adjusted so that the cam ring 15 will move freely to move the leaves 12 to their extreme open positions and to move the leaves 12 to produce a very small central opening.

Referring to Figs. 1 and 13, the camera box 21 is mounted to slide transversely upon the base 22. The casing 23 is formed rigid with the base 22 and extended upwardly in front of the camera box 21. The movable portion 24 of the finder is built integral with the camera box 21 and the lens portion 25 of the finder is built upon the casing 23. The photographing lens magazine 26 is mounted upon the front face of the casing 23. When the camera box 21 is moved laterally upon the base 22 the portion 24 of the finder is brought into registration with the exposure aperture 27 and with the photographing lens operating in line with the exposure aperture.

A ground glass screen 28 is mounted in the front end of the finder portion 24 to fit behind the exposure aperture 27. A sliding door 29 is formed in the outer side of the finder so that the door may be opened and the screen 28 viewed from the back side to assist in adjusting the iris and to see the result upon the screen 28.

When the camera box 21 is in photographing position as in Fig. 1 the film 30 is behind the exposure aperture 27 and the exposure aperture 27 is in line with the aperture 31 through the rear wall 32 of the casing 23. A flange 33 extends forwardly from the edges of the rear wall 32 all the way around thus producing the chamber 34 in front of the wall 32.

The iris mounting 35 is formed of heavy sheet metal and consists of an attaching plate 36 fitting against the front face of the wall 32 and secured in place by screws 37 inserted through the plate 36 and tapped into the wall 32, a supporting plate 38 extending forwardly from one vertical edge of the attaching plate 36, a supporting plate 39 extending forwardly from the other vertical edge of the attaching plate 36 and fitting against the flange 33, a flange 40 extending inwardly from the forward edge of the plate 39 parallel with the plate 36, an arm 41 extending downwardly from the plate 38, and a bearing 42 extending inwardly from the lower end of the arm 41. The mounting 35 is located against the upper horizontal portion of the flange 33 some distance above the exposure aperture 27.

Referring to Figs. 1, 2, 3, 4, 5 and 6. The slide 43 comprises a back plate 44 blocks 45 and 46 soldered to the back plate and a front plate 47 soldered to the blocks. A screw 48 is tapped through the block 45 and has a pintle 49 extending through the bearing 42 and a stop 50 upon the lower end of the pintle so as to hold the screw 48 from endwise movement and allow the screw to rotate. The screw 48 extends upwardly loosely through the flange 33 and has a hand wheel 51 upon its upper end so that by manipulating the hand wheel the slide 43 may be raised or lowered. A screw 52 is inserted downwardly loosely through the flange 33 and tapped through the block 46 and has a hand wheel 53 upon its upper end for operating the screw.

The shaft 54 is mounted through the plate 47, through the opening 2 in the supporting arm 1 and through the plate 44. A sprocket 55 is fixed upon the shaft 54 just in front of the arm 1. The arm 1 swings freely upon the shaft and the sprocket is tight and non-rotatable upon the shaft. The sheet metal belt 19 runs around the sprocket 55.

A bevel pinion 56 is fixed upon the forward end of the shaft 54 in front of the plate 47. A plate 57 is secured to the front face of the plate 47 by screws 58. The bearing 59 is formed integral with the plate 57. A shaft 60 is mounted in the bearing 59 and has a bevel pinion 61 fixed upon its inner end and meshing with the pinion 56. The shaft 60 extends through a vertical elongated slot 62 in the vertical portion of the flange 33 and a shutter 63 is mounted upon the shaft against the inner face of the flange 33 to cover the opening, so that the shaft 60 may go up and down with the slide 43 by manipulating the hand wheel 51.

The adjusting screw plate 4 fits upwardly against the screw 52. A retractile coil spring 64 connects the screw eye 11 to a pin 65 extending through the plates 47 and 44, the tension of the spring 64 being exerted to hold the adjusting screw plate 4 against the screw 52, so that when the hand wheel 53 is manipulated to operate the screw 52 downwardly the screw 52 presses upon the adjusting screw plate 4 and overcomes the tension of the spring 64 and swings the iris 66 in the direction indicated by the arrow 67, and so that when the hand wheel 53 is manipulated in the opposite direction to withdraw the screw 52 the tension of the spring 64 will swing the iris in the direction indicated by the arrow 68.

When the hand wheel 51 is manipulated clockwise the iris 66 will be moved vertically in the direction indicated by the arrow 69, and when the hand wheel 51 is operated in the reverse direction the iris will be moved vertically in the direction indicated by the arrow 70.

A hand wheel 71 is fixed upon the outer end of the shaft 60 and when the hand wheel 71 is operated clockwise the belt 19 will be pulled to rotate the cam ring 15 in the direction indicated by the arrow 72 thereby moving the free ends of the leaves 12 to reduce the size of the iris opening 73, and when the hand wheel 71 is rotated in the opposite direction the belt 19 will be pulled to move the cam ring 15 in the direction indicated by the arrow 74 thereby moving the free ends of the leaves 12 to enlarge the opening 73.

Figure 20:
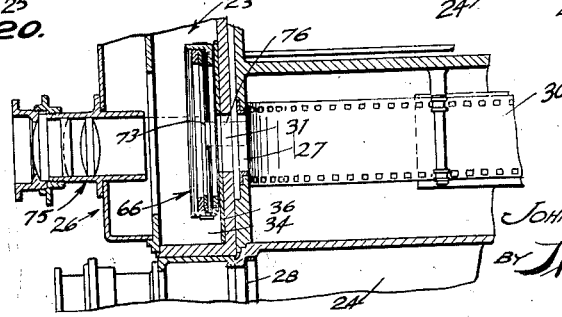
Fig. 20 is a fragmentary horizontal sectional detail on a reduced scale and taken on the lines 20—20 of Figs. 2 and 13 and looking in the direction indicated by the arrows.

Referring to Fig. 20, the opening 73 in the iris 66 is in front of the exposed film 30 and back of the photographing lens construction 75, and the light passing through the photographing lens construction will all be obstructed by the iris 66 except the portion 76 which passes through the opening 73, and by moving the iris up and down by manipulating the hand wheel 51 and by swinging the iris back and forth by manipulating the hand wheel 53 the shaft of light 76 may be directed to any point upon the film 30 within the range of the exposure aperture 27. By manipulating the hand wheel 71 the shaft of light 76 may be made larger or smaller.

Referring to Figs. 13, 14, 15, 16, 17, 18 and 19 the shaft of light 76 produces the spot 77 upon the ground glass screen 28, and by viewing this spot and manipulating the hand wheels 51, 53 and 71 the spot may be made smaller or larger and may be located at any desired point within the area of the exposure aperture 27.

In Fig. 13 the spot 77 is in the upper right-hand corner, in Fig. 14 it is in the lower left-hand corner, in Fig. 15 it is in the lower right-hand corner, in Fig. 16 it is in the upper left-hand corner and in Fig. 17 the iris has been centered and opened to its capacity so that the shaft of light is larger than the exposure aperture. This operation puts the iris temporarily out of use. In Fig. 18 the spot 77 has been considerably enlarged and shifted out of the center and in Fig. 19 the spot 77 has been centered and reduced to the minimum.

Various changes may be made without departing from the spirit of my invention as claimed.

I claim:

1. A camera having an iris between the photographing lens and the exposure aperture, and means for raising and lowering the iris aperture.

2. A camera having an iris between the photographing lens and the exposure aperture, and means for moving the iris aperture laterally.

3. A camera having an iris between the photographing lens and the exposure aperture, and means for moving the iris aperture to register at any desired point in the exposure aperture.

4. A camera having an iris between the photographing lens and the exposure aperture and inside of the camera case, and means having a part extending outside the camera case for moving the iris aperture to register at any desired point in the exposure aperture.

5. A camera having an iris between the photographing lens and the exposure aperture and inside of the camera case, and means having a part extending outside the camera case for adjusting the size of the iris aperture.

6. A camera having an iris between the photographing lens and the exposure aperture and inside of the camera case, means having a part extending outside the camera case for moving the iris aperture to register at any desired point in the exposure aperture, and means having a part extending outside of the camera case for adjusting the size of the iris aperture.

7. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, and an iris mounted in the casing between the photographing lens and the exposure aperture, said iris being provided with means having a part extending outside the casing for adjusting the iris aperture to register at any desired point in the exposure aperture.

8. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, and an iris mounted in the casing between the photographing lens and the exposure aperture, said iris being provided with means having a part extending outside the casing for adjusting the size of the iris aperture.

9. A camera having a base, a casing extending upwardly from one side of the base and having a photographing lens and an exposure aperture, a camera box mounted upon the base to move into and out of registration with the exposure aperture, a finder box mounted upon the camera box to move into registration with the exposure aperture when the camera box moves out of registration and vice versa, and an iris mounted in the casing between the photographing lens and the exposure apertures, said iris being provided with means having a part extending outside the casing for adjusting the iris aperture to register at any desired point in the exposure aperture and said iris also being provided with means having a part extending outside the casing for adjusting the size of the iris aperture.

10. A camera having a transverse face surrounded by a casing and in a plane in front of the exposure aperture and behind the photographing lens, an iris mounting secured against the face, a slide in the iris mounting, means having a part extending outside the casing for moving the slide, an iris pivotally connected to the slide, and means having a part extending outside the casing for swinging the iris upon the pivot.

11. A camera having a transverse face surrounded by a casing and in a plane in front of the exposure aperture and behind the photographing lens, an iris mounting secured against the face, a slide in the iris mounting, means having a part extending outside the casing for moving the slide, an iris pivotally connected to the slide, means having a part extending outside the casing for swinging the iris upon the pivot, and means having a part extending outside the casing for adjusting the size of the iris aperture.

In testimony whereof I have signed my name to this specification.

JOHN E. LEONARD.